(12) United States Patent
Brownlow et al.

(10) Patent No.: US 8,972,956 B2
(45) Date of Patent: Mar. 3, 2015

(54) APPLICATION DEPLOYMENT IN HETEROGENEOUS ENVIRONMENTS

(75) Inventors: Sean T. Brownlow, Rochester, MN (US); Nathan G. Faiman, Rochester, MN (US); Michael T. Kalmbach, Elgin, MN (US); John E. Petri, St. Charles, MN (US); Kevin Wendzel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 13/565,129

(22) Filed: Aug. 2, 2012

(65) Prior Publication Data

US 2014/0040880 A1 Feb. 6, 2014

(51) Int. Cl.
G06F 9/45 (2006.01)
G06F 11/36 (2006.01)
G06F 11/34 (2006.01)

(52) U.S. Cl.
CPC ........ *G06F 11/3616* (2013.01); *G06F 11/3466* (2013.01)
USPC ........... 717/131; 717/127; 717/128; 717/129; 717/130

(58) Field of Classification Search
None
See application file for complete search history.

(56) References Cited

U.S. PATENT DOCUMENTS

| | | | |
|---|---|---|---|
| 6,990,662 B2 * | 1/2006 | Messer et al. | 717/174 |
| 8,090,837 B2 * | 1/2012 | Shin et al. | 709/227 |
| 8,584,128 B1 * | 11/2013 | Don et al. | 718/103 |
| 2004/0158602 A1 * | 8/2004 | Broberg | 709/200 |
| 2005/0033767 A1 * | 2/2005 | Kamentz et al. | 707/104.1 |
| 2005/0251802 A1 * | 11/2005 | Bozek et al. | 718/1 |
| 2005/0262509 A1 * | 11/2005 | Kelly | 718/104 |
| 2009/0049443 A1 * | 2/2009 | Powers et al. | 718/100 |
| 2009/0293056 A1 | 11/2009 | Ferris | |
| 2010/0223378 A1 | 9/2010 | Wei | |
| 2011/0131329 A1 * | 6/2011 | Kaplinger et al. | 709/226 |
| 2011/0131499 A1 | 6/2011 | Ferris et al. | |
| 2011/0213875 A1 | 9/2011 | Ferris et al. | |
| 2012/0102452 A1 * | 4/2012 | Guillou et al. | 717/106 |
| 2012/0149464 A1 * | 6/2012 | Bone et al. | 463/30 |

OTHER PUBLICATIONS

Soumya Mahadevan, "Performance Analysis of Offloading Application-Layer Tasks to Network Processors," Thesis, University of Massachusetts Amherst, Sep. 2007, Amherst, Massachusetts, USA.
Robert Filepp et al., "Image Selection as a Service for Cloud Computing Environments," 2010 IEEE International Conference on Service-Oriented Computing and Applications (SOCA), Dec. 2010.

* cited by examiner

*Primary Examiner* — Isaac T Tecklu
(74) *Attorney, Agent, or Firm* — Patterson & Sheridan, LLP

(57) ABSTRACT

Techniques are disclosed for evaluating an application to determine a processing environment suited for executing the application. A request may be received to execute the application. If execution data identified for the application do not satisfy a first set of criteria, the application is deployed for execution on a first processing environment. If the execution data satisfy the first set of criteria, the application is deployed for execution partially in time on a second processing environment, based on the execution data. The second processing environment provides a higher capability than the first processing environment in terms of at least one resource type.

24 Claims, 10 Drawing Sheets

APPLICATION DEPLOYMENT IN HETEROGENEOUS ENVIRONMENTS

BACKGROUND

Advances in a virtualization technology and mainframe hardware have made a consolidation of applications onto a fewer number of centralized servers very attractive. However, a process of planning and performing such a migration is time-consuming, costly, and prone to an error. A risk is also involved in the migration process due to a high degree of complexity of applications deployed on server devices. For example, consider a large number of distributed applications that can be deployed on servers, also referred to as server devices. One server device could host an application on a middleware product to meet performance and high availability requirements. That application may be distributed over several server devices. This distributed application may require a database which is deployed on another server device. Messaging components to support information exchange with other internal or external applications may require a set of server devices and be deployed to several application servers. Effective consolidation of this set of servers may require an in-depth knowledge of configurations of the set of servers and an insight into how to best plan and run a migration of source applications to the final target platform.

SUMMARY

Embodiments of the invention provide a computer-implemented method, computer program product and system for performing an operation to determine a processing environment suited for executing an application. The operation generally includes receiving a request to execute the application. The operation also includes, upon determining execution data identified for the application do not satisfy a first set of criteria, deploying the application for execution on a first processing environment. The operation also includes, upon determining that the execution data satisfy the first set of criteria, deploying the application for execution partially in time on a second processing environment, based on the execution data. The second processing environment provides a higher capability than the first processing environment in terms of at least one resource type.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
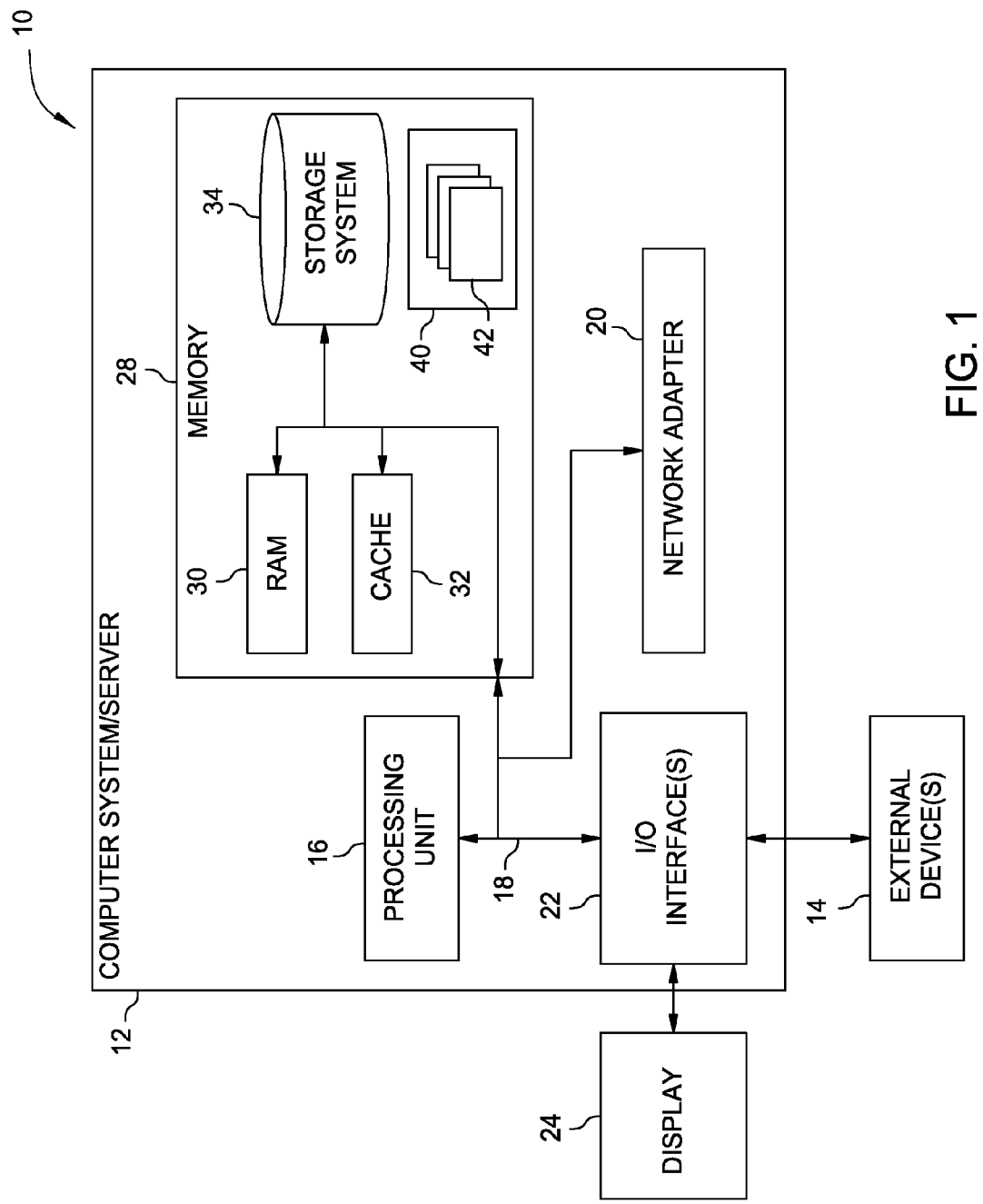
FIG. 1 is a block diagram illustrating a cloud computing node, according to one embodiment of the invention.

Embodiments of the invention generally provide techniques to evaluate an application to determine a processing environment for executing the application. One embodiment provides a deployment tool configured to receive a request to execute the application. The deployment tool is further configured to, deploy the application for execution on a general-purpose processing environment upon determining that insufficient execution data is present for the application. Otherwise (if sufficient execution data is present for the application), the deployment tool is further configured to deploy the application for execution partially in time on a special-purpose processing environment, based on the execution data.

For example, assume the application is a video streaming application that spends its first thirty seconds of execution primarily performing I/O operations to load a video from disk. Assume that the application spends the next sixty seconds of execution primarily performing network operations, e.g., transmitting a portion of the video to a client to allow client buffering. Assume that the application spends the remainder of execution primarily performing graphics operations. To determine these resource demands of the application, the deployment tool analyzes execution data generated from executing the application on the general-purpose processing environment in order to generate an execution plan for the application. The execution plan may include one or more deployment rules, also referred to as migration rules, specifying where and/or when to deploy the application for execution.

Based on the execution plan, the deployment tool may deploy the application for thirty seconds of execution on a first special-purpose processing environment having enhanced I/O capabilities. The deployment tool may then migrate or redeploy the application during runtime to a second special-purpose processing environment having enhanced network capabilities, for a specified period of processing, such as sixty seconds of execution. To this end, the execution of the application on the first special-purpose processing environment may be suspended, and an associated runtime state of the application on the first special-purpose processing environment may be stored and transmitted to the second special-purpose processing environment, such that execution of the application on the second special-purpose processing environment may resume, on the second special-purpose processing environment, from where execution of the application was previously suspended. The deployment tool may then redeploy the application during runtime for execution on a third special-purpose processing environment having enhanced graphics capabilities. At least in some embodiments, the execution plan may be generated based further on an execution plan template supplied by a user providing the application, the execution plan template specifying estimated resource demands of the application.

In some embodiments, part or all of the execution of the application may occur on the general-purpose processing environment rather than on a special-purpose processing environment, based on user preferences, which may be specified in a service level agreement associated with the application. Because a user providing the application may incur a higher monetary cost from executing the application on a special-purpose processing environment than on a general-purpose processing environment, the user may manage the monetary cost incurred via the service level agreement. Further, in some embodiments, the deployment tool may deploy the application for execution on a variety of special-purpose processing environments to generate trial data for the application. Such execution may also be referred to herein as trial execution. Depending on the embodiment, trial executions of the application on a given special-purpose processing environment may be from start to finish or only partial in time. The special-purpose processing environment may then be selected based on the trial data in addition to the execution data. For example, assume availability of two special-purpose processing environments with enhanced graphics capabilities, each environment having a graphics card from a different vendor. In one embodiment, the deployment tool may analyze the trial data to determine graphics card provides better performance for executing the application. Accordingly, when redeploying the application for execution on a special-purpose processing environment having enhanced graphics capabilities, the deployment tool may select the special-purpose processing environment having the determined graphics card.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
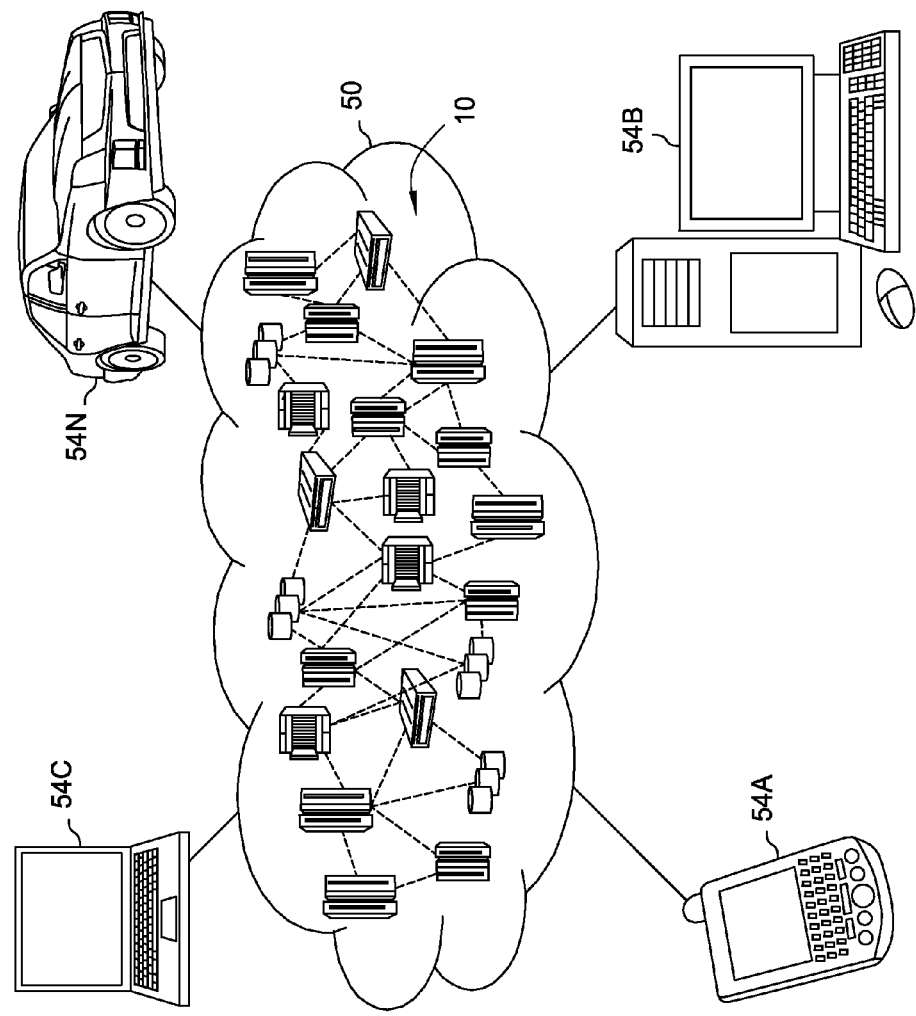
FIG. 2 illustrates a cloud computing environment, according to one embodiment of the invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
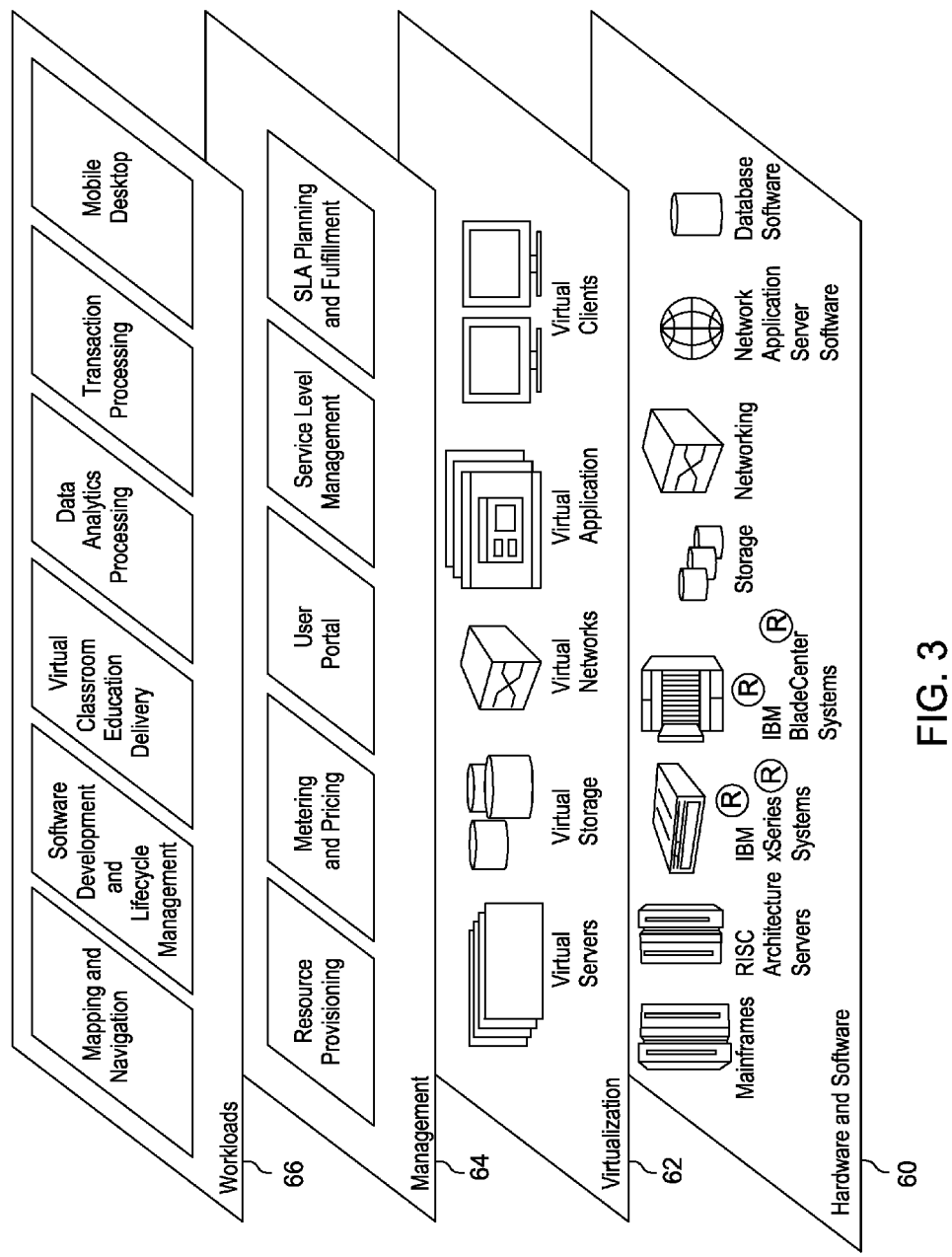
FIG. 3 illustrates abstraction model layers, according to one embodiment of the invention.

Referring now to FIG. 3, a set of functional abstraction layers provided by cloud computing environment 50 (FIG. 2) is shown. It should be understood in advance that the components, layers and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. The SLA generally specifies the services, priorities, responsibilities, guarantees and/or warranties that exist between a service provider and a customer.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access deployed applications or related data available in the cloud. The deployed applications could execute on a suitable processing environment in the cloud, and a deployment tool could compute a cost to be charged for executing a given application, where the cost is determined based at least in part on the processing environment(s) on which the given application is deployed for execution. Thus, the user may access the applications from any computing system attached to a network connected to the cloud (e.g., the Internet) and be charged based on the processing environment(s) used.

Figure 4:
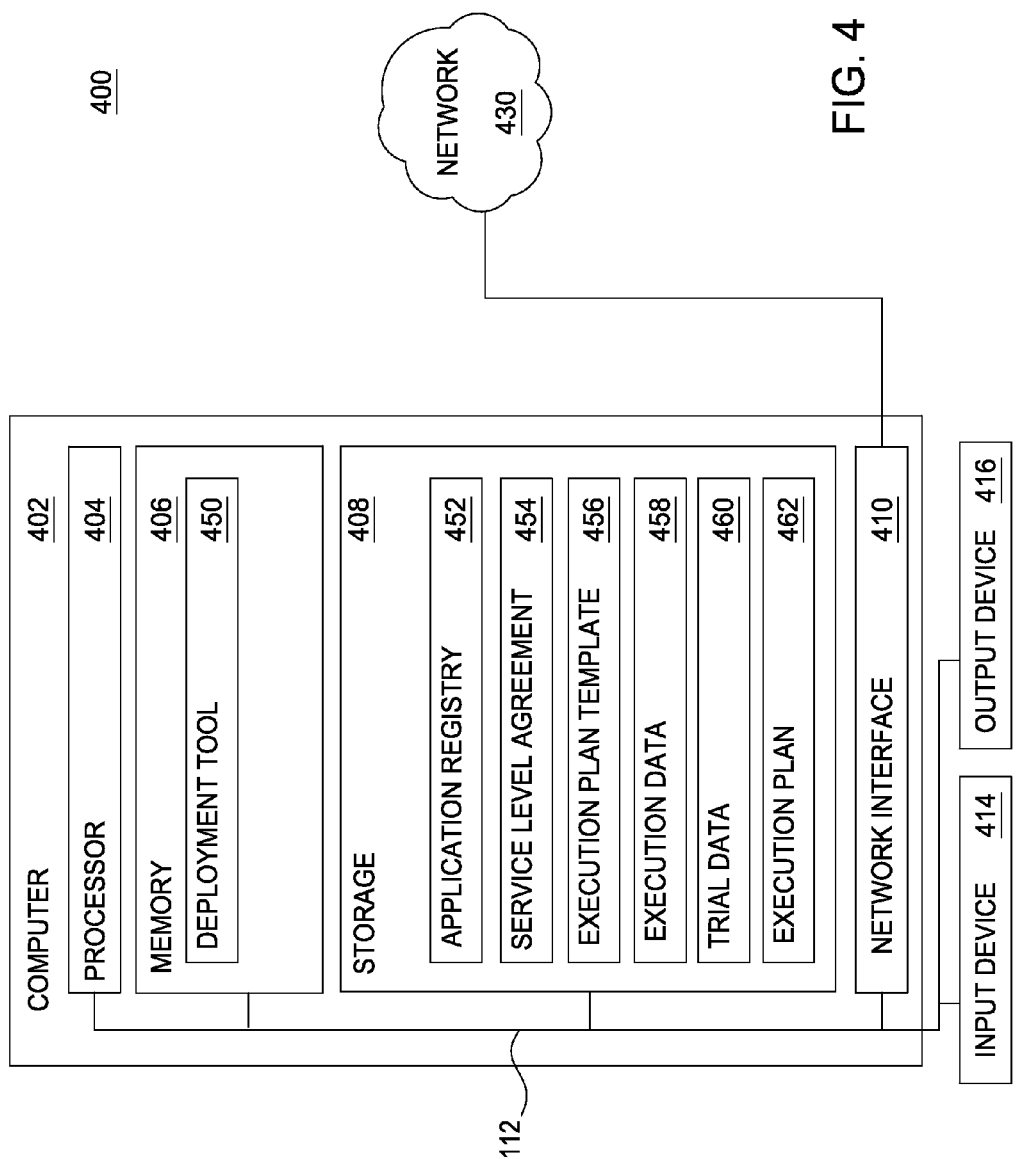
FIG. 4 is a block diagram of a networked system to evaluate an application to determine a processing environment suited for executing the application, according to one embodiment of the invention.

FIG. 4 is a block diagram of a networked system 400 for evaluating an application for deployment, according to one embodiment of the invention. The networked system 400 includes a computer 402. The computer 402 may also be connected to other computers via the network 430. In general, the network 430 may be a telecommunications network and/or a wide area network (WAN). In a particular embodiment, the network 430 is the Internet.

The computer 402 generally includes a processor 404 connected via a bus 412 to a memory 406, a network interface device 410, a storage 408, an input device 414, and an output device 416. The computer 402 is generally under the control of an operating system. Examples of operating systems include UNIX, versions of the Microsoft Windows® operating system, and distributions of the Linux® operating system. More generally, any operating system supporting the functions disclosed herein may be used. The processor 404 is included to be representative of a single CPU, multiple CPUs, a single CPU having multiple processing cores, and the like. Similarly, the memory 406 may be a random access memory. While the memory 406 is shown as a single identity, it should be understood that the memory 406 may comprise a plurality of modules, and that the memory 406 may exist at multiple levels, from high speed registers and caches to lower speed but larger DRAM chips. The network interface device 410 may be any type of network communications device allowing the computer 402 to communicate with other computers via the network 430.

The storage 408 may be a persistent storage device. Although the storage 408 is shown as a single unit, the storage 408 may be a combination of fixed and/or removable storage devices, such as fixed disc drives, solid state disc (SSD) drives, floppy disc drives, tape drives, removable memory cards or optical storage. The memory 406 and the storage 408 may be part of one virtual address space spanning multiple primary and secondary storage devices.

The input device 414 may be any device for providing input to the computer 402. For example, a keyboard or mouse may be used. The output device 416 may be any device for providing output to a user of the computer 402. For example, the output device 416 may be any conventional display screen or set of speakers, along with their respective interface cards, i.e., video cards and sound cards (not shown). Although shown separately from the input device 414, the output device 416 and input device 414 may be combined. For example, a display screen with an integrated touch-screen may be used.

As shown, the memory 406 of the computer 402 includes a deployment tool 450. The storage 408 of the computer 402 includes an application registry 452, a service level agreement 454, an execution plan template 456, execution data 458, trial data 460, and an execution plan 462. In one embodiment, the application registry 452 specifies a set of applications available for deployment by the deployment tool 450. The deployment tool 450 may deploy an application for execution on a general-purpose processing environment to generate the execution data 458. At least in some embodiments, the general-purpose processing environment may be selected from multiple general-purpose processing environments having similar capabilities in terms of resource types. The execution data 458 characterizes runtime workloads or resource demands of the application over time and in terms of at least one resource type, when executing on the general-purpose processing environment.

In one embodiment, the deployment tool 450 deploys the application for execution partially in time on a special-purpose processing environment selected based on the execution data 458. For example, the application may execute on the special-purpose processing environment for a first time duration and on the general-purpose processing environment (or another special-purpose processing environment) for a second time duration. Each time duration may be also referred to herein as a time slice or time interval. The selected special-purpose processing environment may be configured to better suit the resource demands of the application as indicated by the execution data, compared to the general-purpose processing environment. In some embodiments where distinct special-purpose processing environments—referred to as candidate environments—suit the resource demands of the application, the deployment tool 450 may deploy the application to execute on each of the candidate environments to generate trial data 460. The trial data 460 characterizes runtime performance of the application over time and when executing in a special-purpose processing environment. The deployment tool 450 may then deploy the application for execution partially in time on one of the candidate environments—referred to as a target environment—that is selected based on the trial data 460 as best suiting the resource demands of the application, as compared to the other candidate environments. In some embodiments, the deployment tool 450 generates the trial data 460 and/or the execution data based at least in part on output obtained from predefined application tuning and/or benchmarking utilities (e.g., top, perfmonitor, nmon, etc).

At least in some embodiments, the application stores data specifying where and/or when to deploy the application in the form of the execution plan 462 for the application. The execution plan 462 may be generated and/or updated based on the execution data 458 and/or the trial data 460 and optionally based further on an execution plan template 456 supplied by a user providing the application, where the execution plan template 456 specifies expected resource demands of the application. The execution plan template 456 may be supplied to assist the deployment tool 450 to select a suitable processing environment more accurately and/or quickly. Further, an execution plan that is generated based on the execution data 458 and not the trial data 460 may be referred to herein as a baseline execution plan. At least in some embodiments, the target environment and/or the candidate environments and/or deployment intervals may be selected based further on user preferences pertaining to processing environments and/or resource types and/or monetary costs thereof. At least in some embodiments, the user preferences may be specified in the service level agreement 454. Put another way, a user providing the application may specify, in the service level agreement, how much the user is willing to pay for executing the application, in terms of monetary costs. In still other words, a user may specify a quality of service desired by the user for executing the application.

In some embodiments, in addition to quantifying the willingness of the user to pay in terms of monetary cost, the service level agreement may qualify the willingness of the user to pay in terms of time of day, day of week, enhanced capability provided, etc. For example, the user may express, in the service level agreement, a willingness to pay extra for enhanced graphics capabilities, but only on weekends between 5-8 pm. Additionally or alternatively, the service level agreement may also specify a willingness to pay extra for enhanced network capabilities on Mondays through Fridays between 8 am-8 pm. The service level agreement may also specify time periods and/or enhanced capabilities for which the user is not willing to pay extra. The deployment tool 450 may deploy the application for execution on the general-purpose processing environment during such time periods. Further, in some embodiments, the execution plan may also be modified based on the service level agreement 454.

Accordingly, the application may execute more efficiently using—even if only partially in time—the enhanced capabilities provided by one or more special-purpose processing environments. Further, the user providing the application may adjust the service level agreement to limit or otherwise manage the monetary cost incurred from executing the application. Consequently, the user need not endure performance associated with executing the application from start to finish on a general-purpose processing environment, which may be undesirably slow to the user. Further, the user need not incur a monetary cost associated with executing the application from start to finish on a special-purpose processing environment, which may be prohibitively expensive for the user. The user also need not incur an effort involved in attempting to determine, with some degree of accuracy, special-purpose processing environment(s) suited to the resource demands of the application. Further, processing environments with distinct capabilities in a heterogeneous computing environment may also be utilized more effectively, because applications are migrated to those processing environments most equipped to satisfy the resource demands of the application—as the resource demands change over time during execution of the application.

Figure 5:
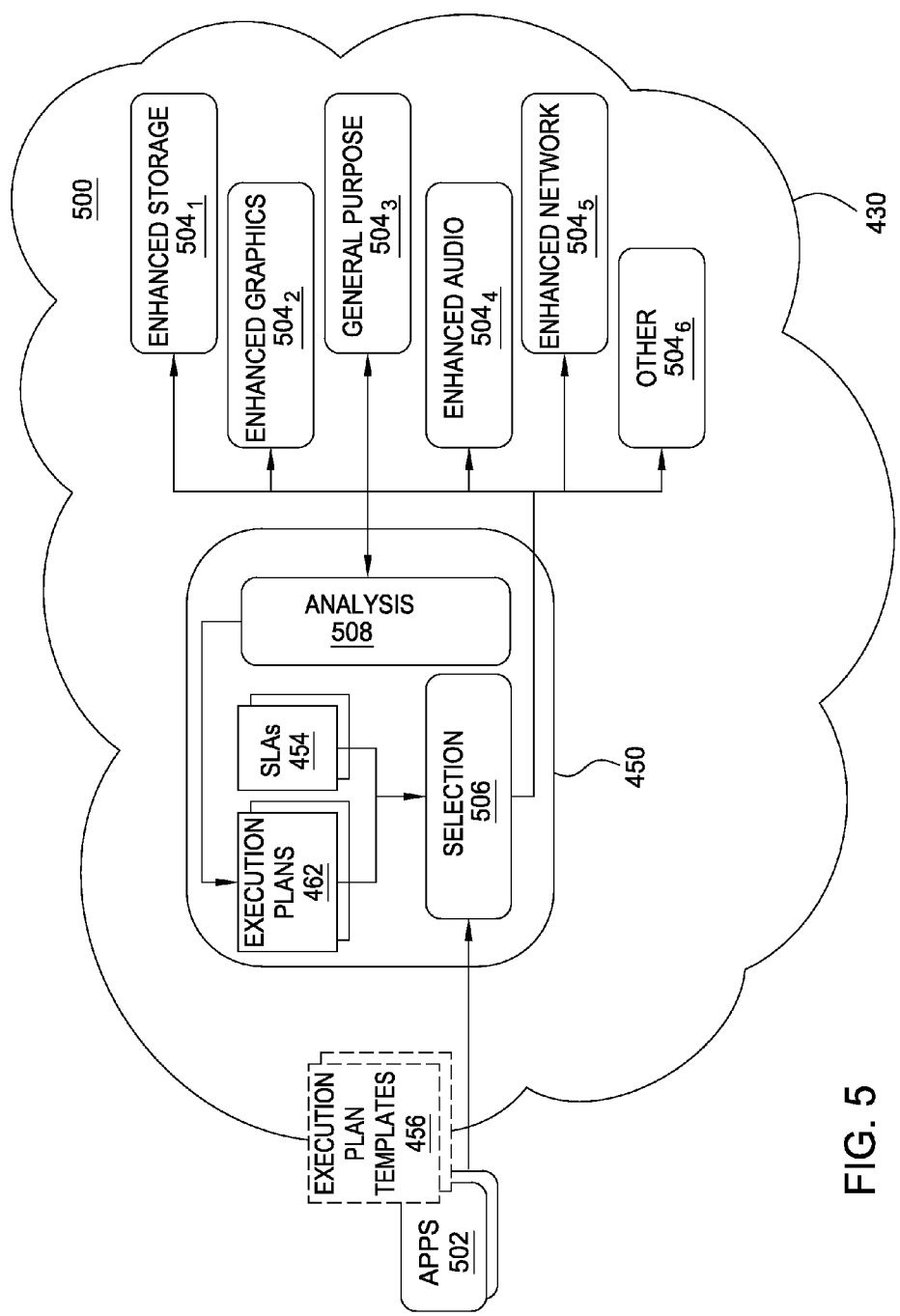
FIG. 5 is a block diagram showing heterogeneous processing environments on which the application may be deployed for execution, according to one embodiment of the invention.

FIG. 5 is a block diagram showing heterogeneous processing environments on which an application may be deployed for execution, according to one embodiment of the invention. As shown, the deployment tool 450 deploys applications 502 to processing environments 504 based on execution plans 462, service level agreements 454, and/or execution plan templates 456. The processing environments 504 include a general-purpose processing environment $504_3$, a special-purpose processing environment $504_1$ having enhanced storage capability, a special-purpose processing environment $504_2$ having enhanced graphics capability, a special-purpose processing environment $504_4$ having enhanced audio capability, and a special-purpose processing environment $504_5$ having enhanced network capability. The processing environments 504 may also include other environments $504_6$, such as special-purpose processing environments with enhanced processor or memory capability, etc.

In one embodiment, the deployment tool 450 performs a selection operation 506 to determine when and/or where to deploy (and redeploy) the applications 502 to the processing environments 504, on the basis of the execution plans 462, the service level agreements 454, and/or the execution plan templates 456. As described above, to this end, the execution plan may include one or more deployment rules specifying time durations and target processing environments, during and on which the application is to execute. The time durations may be measured relative to a time at which execution of (a given instance of) the application is commenced. In some embodiments, the service level agreement may also specify part or all of the information represented by the one or more redeployment rules or may include the one or more redeployment rules outright.

In one embodiment, the deployment tool 450 also performs an analysis operation 508 on execution data and/or trial data generated from executing the applications 502, in order to generate and/or update the execution plans 462. Accordingly, the application may be deployed in a manner that better suits the needs of the application and/or the user providing the application, relative to alternative approaches for managing execution of the application on heterogeneous processing environments.

In some embodiments, the deployment tool 450 may also perform one or more predefined operations to reduce overhead incurred from redeploying the application from processing environment to processing environment. For example, assume that the deployment tool 450 is to redeploy an application from a current processing environment to a next processing environment. Assume further that there are two candidate processing environments having the same capability. In one embodiment, to reduce redeployment overhead, the deployment tool 450 may favor the candidate processing environment more proximate to the current processing environment in terms a set of predefined criteria such as network distance, geographical distance, etc. In cases where the deployment tool 450 determines that any processing benefit gained from redeploying the application is outweighed by the redeployment overhead incurred, the deployment tool 450 may refrain from one or more redeployments of the application. The deployment tool 450 may also update the execution plan accordingly, such as to reduce the number of redeployments specified in the deployment plan. In other embodiments, a requesting entity and/or an administrative user of the deployment tool 450 may also specify a maximum number of redeployments for a given execution of the application. In some embodiments, the deployment tool 450 may also generate an alert to inform the administrative user, upon determining that performance of the application has degraded beyond a predetermined threshold, e.g., a maximum execution time for the application. Based on the alert, the administrative user may reconfigure the deployment tool 450, the application, the execution plan, the network topology, etc.

Figure 6:
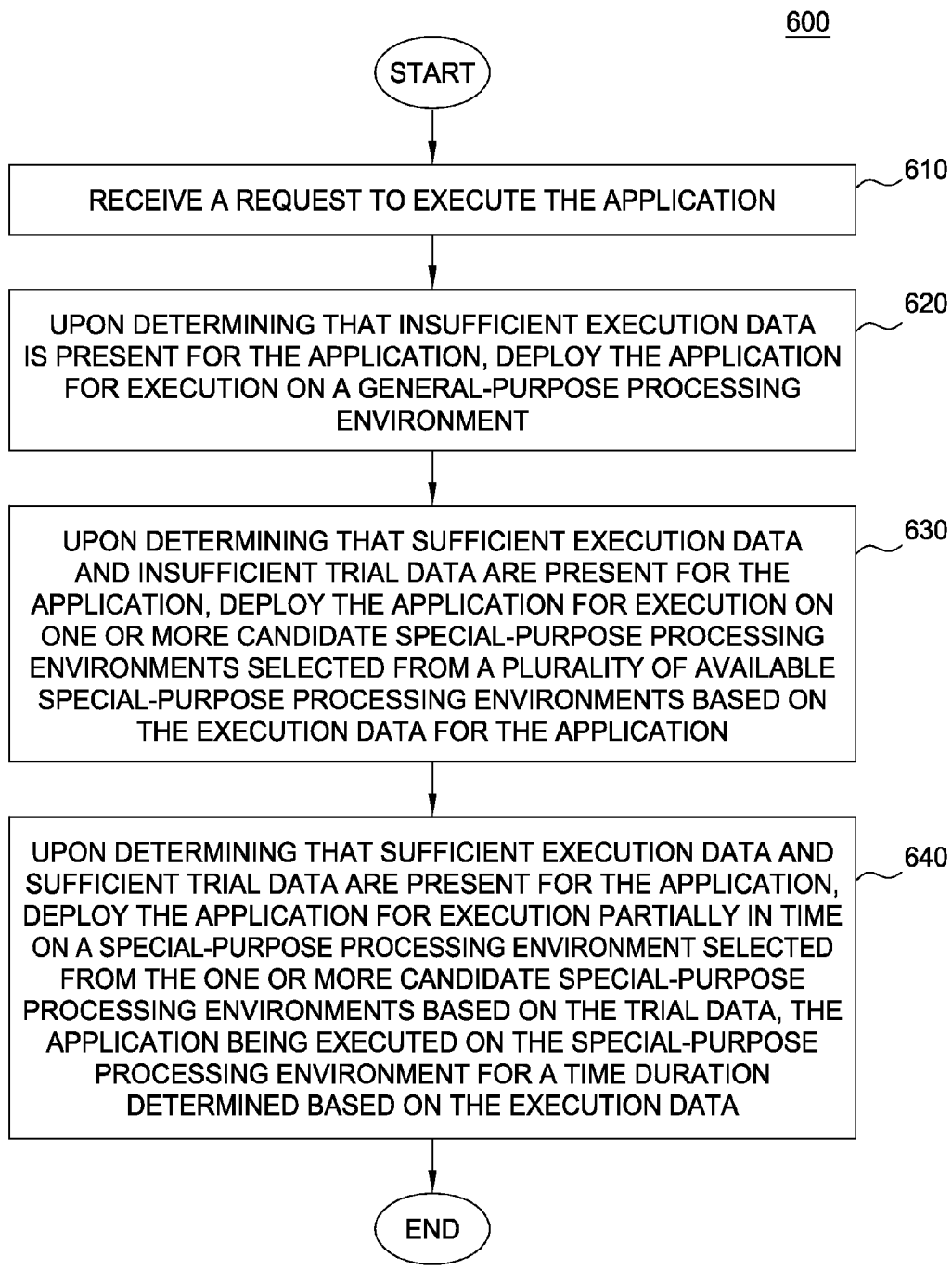
FIG. 6 is a flowchart depicting a method for evaluating an application for deployment, according to one embodiment of the invention.

FIG. 6 is a flowchart depicting a method 600 for evaluating an application for deployment, according to one embodiment of the invention. As shown, the method 600 begins at step 610, where the deployment tool 450 receives a request to execute the application. At step 620, upon determining that insufficient execution data is present for the application, the deployment tool 450 deploys the application for execution on a general-purpose processing environment. Depending on the embodiment, whether sufficient execution data is present may be determined based on a predefined condition, such as the application having been executed a threshold count of times on the general-purpose processing environment, the application having been executed for a threshold time duration on the general-purpose processing environment, a threshold amount of the execution data having been generated, etc. The thresholds may be user-specified as desired to suit the needs of a particular case. Depending on the embodiment, the predefined condition may specify qualitative and/or quantitative criteria pertaining to the execution data.

At step 630, upon determining that sufficient execution data and insufficient trial data exists for the application, the deployment tool 450 deploys the application for execution on one or more candidate environments, each selected from a set of available special-purpose processing environments. Depending on the embodiment, whether sufficient trial data is present for a given special-purpose processing environment may be determined based on a predefined condition, such as the application having been executed a threshold count of times, the application having been executed for a threshold time duration, a threshold amount of the trial data having been generated, etc. Depending on the embodiment, the predefined condition may specify qualitative and/or quantitative criteria pertaining to the trial data. Depending on the embodiment, the predefined condition may pertain to a given special-purpose processing environment, all candidate environments, all available special-purpose processing environments, etc.

At step 640, upon determining that sufficient execution data and sufficient trial data are present for the application, the deployment tool 450 deploys the application for execution at least partially in time on a target environment selected from the one or more candidate environments based on the trial data—e.g., for a time duration determined based on the execution data and/or the trial data. For example, the time duration may be determined based on corresponding time durations during which the trial data indicates that the application is particularly demanding in terms of a given resource type, e.g., one for which enhanced capability is provided by the target environment, relative to the general-purpose processing environment. In particular, the time duration may be determined by any statistical measure of the corresponding time durations, such as an arithmetic mean. After the step 640, the method 600 terminates.

In some embodiments, each execution of the application occurs only upon receipt of an explicit request to execute the application from a requesting entity such as a user of the deployment tool. In such embodiments, a suitable processing environment may not necessarily be determined until multiple requests for execution of the application are received and processed. This is because accuracy of the execution data and/or trial data may often only improve gradually as the execution data and/or trial data is updated based on each subsequent execution of the application. In other embodiments, one or more executions of the application occur independent of any such request from the requesting entity, to facilitate selection of a suitable processing environment when the request is subsequently received. In still other embodiments, upon receiving a request for a single execution of the application, the deployment tool 450 nevertheless deploys the application for multiple executions, such that a suitable processing environment may sooner be determined.

Figure 7:
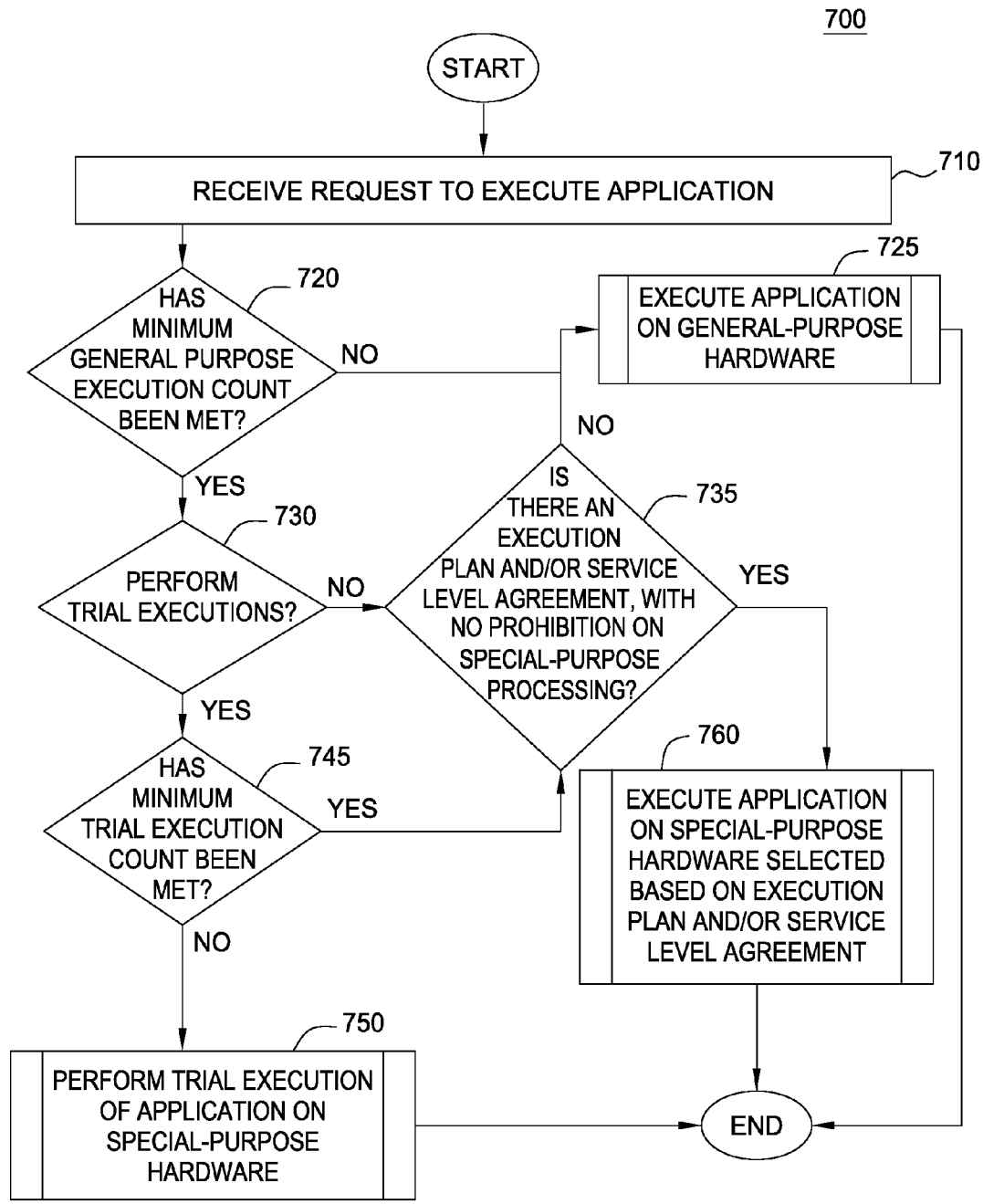
FIG. 7 is a flowchart depicting a method for using predefined conditions to evaluate an application for deployment, according to one embodiment of the invention.

FIG. 7 is a flowchart depicting a method 700 for using predefined conditions to evaluate an application for deployment, according to one embodiment of the invention. As shown, the method 700 begins at step 710, where the deployment tool 450 receives a request to execute the application. At step 720, the deployment tool 450 determines whether the application has been executed on the general-purpose processing environment for a threshold count of times. If not, the deployment tool 450 deploys the application for execution on the general-purpose processing environment (step 725). The step 725 is further described below in conjunction with FIG. 8.

On the other hand, if the deployment tool 450 determines that the threshold is met (step 720), then the deployment tool 450 determines whether trial executions are enabled (step 730). For example, whether trial executions are enabled may be specified by a flag set by a user providing the application and/or by an administrative user managing the deployment tool 450. If trial executions are enabled, then the deployment tool 450 determines whether the application has been executed on special-purpose processing environments for a threshold count of times (step 745). If not, the deployment tool 450 deploys the application for execution on a candidate special-purpose processing environment (step 750). The step 750 is further described below in conjunction with FIG. 10.

If trial executions are not enabled (step 730) or the application has not been executed on the special-purpose processing environments for the threshold count of times (step 745), then the deployment tool 450 determines whether an execution plan and/or a service level agreement is present for the application, with no prohibition on special-purpose processing (step 735). For example, in some embodiments, the service level agreement may specify that a user has prohibited special-purpose processing.

If the execution plan and/or the service level agreement is present for the application, with no prohibition on special-purpose processing, then the deployment tool 450 deploys the application for execution at least partially in time on a target special-purpose processing environment selected based on the execution plan and/or the service level agreement (step 760); otherwise, the deployment tool 450 deploys the application for execution on the general-purpose processing environment (the step 725). The step 760 is further described below in conjunction with FIG. 9. Depending on the embodiment, the target special-purpose processing environment may be selected from the candidate environments or directly from the set of available special-purpose processing environments. The duration for which the application executes on the special-purpose processing environment is also determined based on the execution plan and/or the service level agreement. After the steps 725, 750 or 760, the method 700 terminates.

Figure 8:
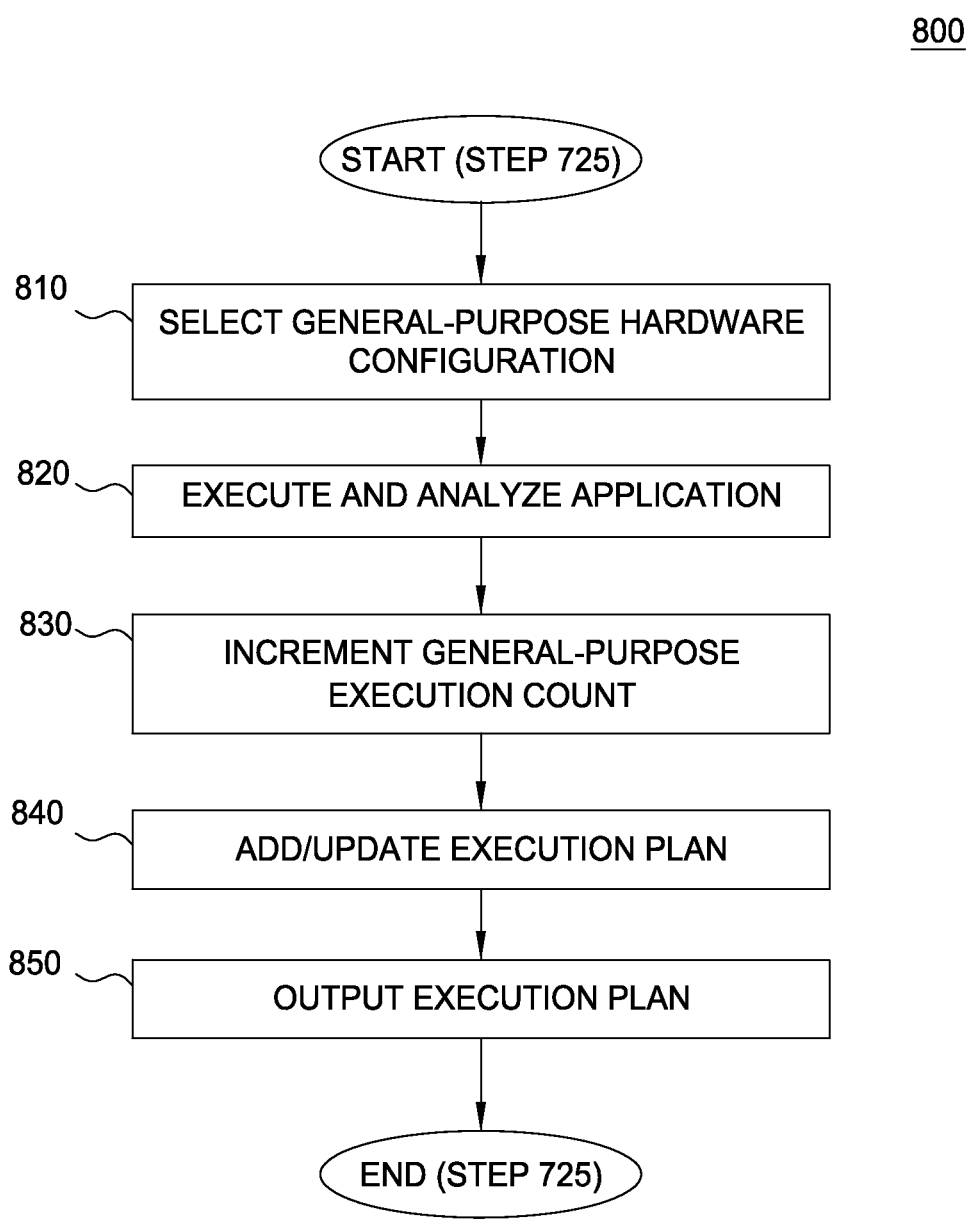
FIG. 8 is a flowchart depicting a method for deploying an application for execution on the general-purpose processing environment, according to one embodiment of the invention.

FIG. 8 is a flowchart depicting a method 800 for deploying an application for execution on the general-purpose processing environment, according to one embodiment of the invention. The method 800 corresponds to the step 725 of FIG. 7. As shown, the method 800 begins at step 810, where a general-purpose hardware environment is selected by the deployment tool 450 and/or the requesting entity. At step 820, the deployment tool 450 analyzes execution data generated from executing the application on the general-purpose processing environment. At step 830, the deployment tool 450 increments a counter representing a total number of times the application has executed, e.g., from start to finish, on the general-purpose processing environment.

At step 840, the deployment tool 450 generates or updates an execution plan for the application, based on analyzing the execution data. At step 850, the deployment tool 450 outputs the execution plan in whole or in part to the requesting entity. In alternative embodiments, the deployment tool 450 generates output for the requesting entity based on the execution plan, while the execution plan itself is not output to the requesting entity. For example, the deployment tool 450 may generate output in the form of suggested special-purpose processing environments and associated monetary costs, and the output may be generated based on the execution plan and/or service level agreement. The user may specify to adopt one or more of the suggested special-purpose processing environments for subsequent executions of the application. The execution plan, service level agreement, and/or execution plan template may be modified to reflect the user adoption. Accordingly, the output assists the user in discovering when and where to execute the application on a special-purpose processing environment, to improve a cost effectiveness of executing the application for the user at least in some cases. In alternative embodiments, the deployment tool 450 determines to adopt the execution plan based on information included in the service level agreement, e.g., monetary cost thresholds, without prompting for any input from the user. After the step 850, the method 800 terminates.

Figure 9:
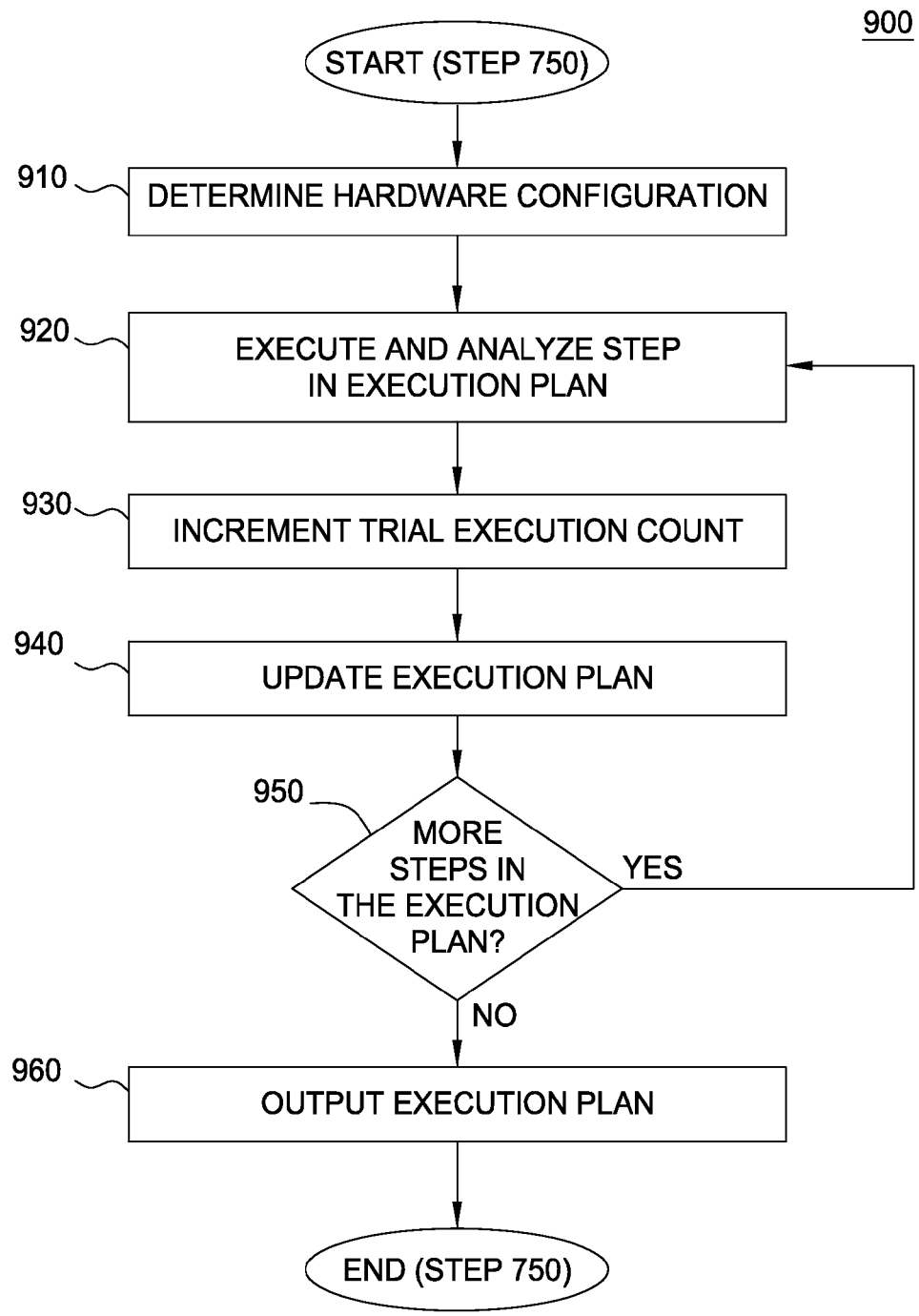
FIG. 9 is a flowchart depicting a method for deploying an application for execution on a candidate special-purpose processing environment, according to one embodiment of the invention.

FIG. 9 is a flowchart depicting a method 900 for deploying an application for execution on a candidate special-purpose processing environment, according to one embodiment of the invention. The method 900 corresponds to the step 750 of FIG. 7. As shown, the method 900 begins at step 910, where the candidate special-purpose processing environment is selected by the deployment tool 450 and/or the requesting entity. At step 920, the deployment tool 450 analyzes trial data generated from executing the application on the candidate special-purpose processing environment. At step 930, the deployment tool 450 increments a counter representing a total number of times the application has executed, e.g., from start to finish, on the special-purpose processing environment. At step 940, the deployment tool 450 updates the execution plan based on analyzing the trial data. If the execution plan specifies to perform any further execution of the application (step 950), then the method 900 returns to the step 920 to further execute the application. Otherwise, the deployment tool 450 outputs, to the requesting entity, the execution plan itself or an output generated from the execution plan (step 960). After the step 960, the method 900 terminates.

Figure 10:
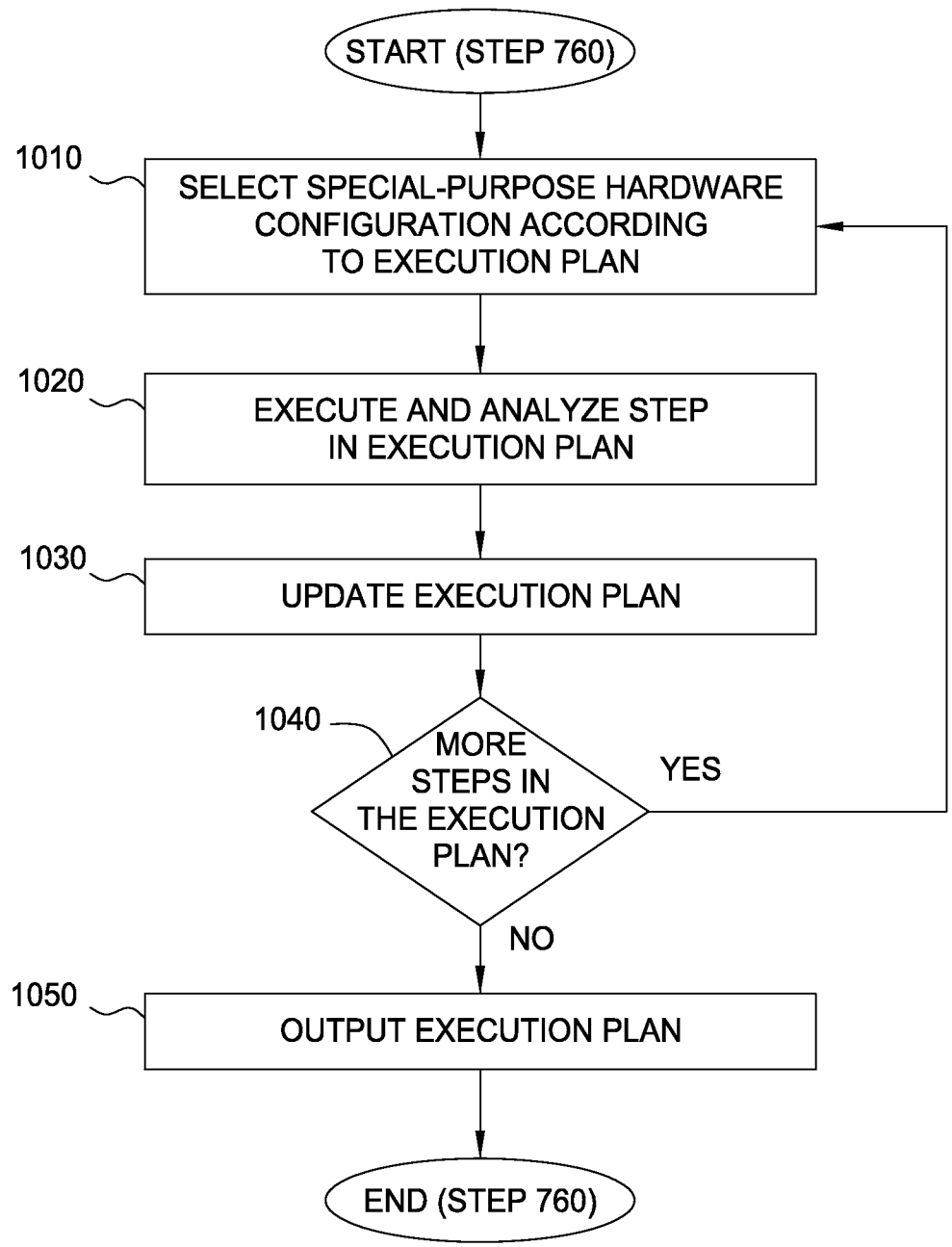
FIG. 10 is a flowchart depicting a method for deploying an application for execution on a target special-purpose processing environment, according to one embodiment of the invention.

FIG. 10 is a flowchart depicting a method 1000 for deploying an application for execution on a target special-purpose processing environment, according to one embodiment of the invention. The method 1000 corresponds to the step 760 of FIG. 7. As shown, the method 1000 begins at step 1010, where the deployment tool 450 determines a target special-purpose processing environment based on the execution plan and/or service level agreement. At step 1020, the deployment tool 450 analyzes data generated from executing the application on the target special-purpose processing environment. The generated data may be referred to herein as target data and, as with trial data, may also be used by the deployment tool 450 in modifying the execution plan (step 1030). At step 1040, the deployment tool 450 determines whether the execution plan specifies to perform any further execution of the application, and if so, the method 1000 returns to the step 1010 to further execute the application. Otherwise, the deployment tool 450 outputs, to the requesting entity, the execution plan itself or an output generated from the execution plan (step 1050). After the step 1050, the method 1000 terminates.

Although embodiments are described herein with reference to analyzing and deploying applications based on execution data and/or trial data, other embodiments are broadly contemplated. For example, in one embodiment, an application may be analyzed and/or deployed based on further data characterizing resource needs of the application, where the data is generated by analyzing code of the application, also referred to as static analysis. The data is also referred to herein as static data. Examples of the code include source code, object code, and machine code. In contrast to execution data, which is generated from executing the application on a general-purpose processing environment, and trial data, which is generated from executing the application on a candidate special-purpose processing environment, static data is generated without executing the application on any processing environment. When analyzing code of the application, the deployment tool 450 also analyze any associated code, such as application programming interfaces (APIs), libraries, modules, etc.

In one embodiment, the static data may characterize resource demands of an application in terms of at least one resource type. For example, assume that upon analysis, the source code of the application includes function calls to a socket API. Accordingly, the deployment tool 450 may determine that the application demands network resources. The number and nature of the function calls may also be further analyzed, according to predefined rules specified by a user of the deployment tool 450, to determine a likely extent to which network resources are demanded by the application. Further, code analysis may be performed with assistance of one or more predetermined code browsing tools, such as included in Cscope and some integrated development environment (IDE) tools such as Eclipse™ Depending on the embodiment, code analysis may be programmatically and/or manually performed in part or in full. In some embodiments, a report is programmatically generated based on code analysis, the report summarizing resource demands of the application. In such embodiments, the static data may further include the generated report.

Further, in one embodiment, the static data may serve as a substitute for part or all of execution data and/or trial data. For example, where the amount of execution data would otherwise be insufficient, the execution data may nevertheless suffice—when combined a sufficient amount of static data—to allow the application to be deployed for execution partially in time on a special-purpose processing environment and, to that end, generate a set of candidate special-purpose processing environments. As another example, where the amount of trial data would otherwise be insufficient, the trial data may nevertheless suffice—when combined with a sufficient amount of static data—to allow the application to be deployed for execution partially in time on a special-purpose processing environment selected from the set of candidate special-purpose processing environments. Further still, the special-purpose processing environment and/or the candidate environments may be selected based on the static data. The amount of relative weight accorded to each the of the execution data, the trial data, and the static data—in terms of analysis, deployment, and/or data sufficiency determination—may be configured by a user of the deployment tool 450 and may be tailored to suit the needs of an individual case.

In one embodiment, the application is deployed based further on a current utilization of the special-purpose processing environment, where the current utilization characterizes a workload of the special-purpose processing environment in terms of at least one resource type. For example assume that the deployment tool 450 is to redeploy the application to a special-purpose processing environment with enhanced network capabilities. Upon determining that the special-purpose processing environment has a current utilization exceeding a user-specified threshold, the deployment tool 450 refrains from redeploying the application to the special-purpose processing environment after all, to avoid over-utilization of the special-purpose processing environment. In some embodiments, executing the application 450 partially in time on a given special-purpose environment may incur a monetary cost that is dependent on a current utilization of the special-purpose environment. In some embodiments, the deployment tool 450 may nevertheless deploy the application for execution on the special-purpose processing environment, upon determining that the service level agreement associated with the application indicates that the user providing the application is willing to pay the higher monetary cost associated with a high level of utilization of the special-purpose processing environment.

Embodiments disclosed herein provide techniques for evaluating an application for deployment. One embodiment provides a deployment tool that receives a request is received to execute the application. Upon determining that insufficient execution data is present for the application, the deployment tool deploys the application for execution on a general-purpose processing environment. Upon determining that sufficient execution data is present for the application, the deployment tool deploys the application for execution partially in time on a special-purpose processing environment, based on the execution data.

Accordingly, the application may execute more efficiently using—even if only partially in time—the enhanced capabilities provided by one or more special-purpose processing environments. Further, the user providing the application may adjust the service level agreement to manage the monetary cost incurred from executing the application on heterogeneous processing environments. Consequently, the user need not endure performance associated with executing the application from start to finish on a general-purpose processing environment, which may be undesirably slow to the user. Further, the user need not incur the monetary cost associated with executing the application from start to finish on a special-purpose processing environment, which may be prohibitively expensive for the user. The user also need not incur the effort involved in attempting to determine, with some degree of accuracy, special-purpose processing environment(s) suited to the resource demands of the application. Further, processing environments with distinct capabilities in a heterogeneous computing environment may also be utilized more effectively, because applications are migrated to those processing environments most equipped to satisfy the resource demands of the application—as the resource demands change over time during execution of the application.

While the foregoing is directed to embodiments of the present invention, other and further embodiments of the invention may be devised without departing from the basic scope thereof, and the scope thereof is determined by the claims that follow.

What is claimed is:

1. A computer-implemented method to determine a processing environment suited for executing an application, the method comprising:
  receiving a request to execute the application;
  upon determining that execution data identified for the application do not satisfy a first set of criteria, deploying the application for execution on a first processing environment; and
  upon determining that the execution data satisfy the first set of criteria:
    upon determining that trial data identified for the application do not satisfy a second set of criteria, deploying the application for execution on one or more candidate processing environments selected from a plurality of available processing environments based on the execution data; and
    upon determining that trial data identified for the application satisfy the second set of criteria, deploying the application for partial execution on a second processing environment of the one or more candidate processing environments, based on the execution data and the trial data,
  wherein the one or more candidate processing environments provide a higher capability than the first processing environment in terms of at least a first resource type.

2. The computer-implemented method of claim 1, wherein execution of the application is temporarily suspended in order to transfer the application between processing environments.

3. The computer-implemented method of claim 2, wherein each of the first set of criteria and the second set of criteria includes at least one of a qualitative criterion and a quantitative criterion, wherein the application is partially executed on at least one of the one or more candidate processing environments and the second processing environment for a first time duration determined based on the execution data, and wherein the application is partially executed on the first processing environment for a second time duration different from the first time duration.

4. The computer-implemented method of claim 3, wherein the execution data characterizes resource demands of the application over time in terms at least the first resource type and when executing in the first processing environment;
wherein the trial data characterizes performance of the application when executing in the one or more candidate processing environments;
wherein each available processing environment provides an enhanced capability relative to the first processing environment in terms of at least the first resource type.

5. The computer-implemented method of claim 4, wherein the application is deployed based further on static data generated via analyzing code of the application and without executing the application, wherein the code comprises at least one of source code, object code, and machine code;
wherein the application is deployed based further on a current utilization of at least one of the one or more candidate processing environments and the second processing environment, wherein the current utilization characterizes a load of the at least one of the one or more candidate processing environments and the second processing environment in terms of the second resource type.

6. The computer-implemented method of claim 5, wherein the application is executed on the first processing environment to generate execution data for the application, and wherein the application is executed on the one or more candidate processing environments to generate trial data for the application, and wherein the method further comprises:
analyzing the execution data for the application to generate an execution plan for the application;
selecting the one or more candidate processing environments based on the execution plan generated for the application;
analyzing the trial data for the application to update the execution plan for the application; and
selecting the second processing environment based on the updated execution plan for the application.

7. The computer-implemented method of claim 6, wherein the execution plan is generated based further on an execution plan template from a requesting entity from which the request to execute the application is received;
wherein the one or more candidate processing environments are selected based further on a service level agreement from the requesting entity, wherein the second processing environment is selected based further on the service level agreement, wherein the service level agreement specifies what is acceptable to the requesting entities in terms of at least one of processing environments, resource types, and monetary costs;
wherein each resource type is selected from at least processor, memory, storage, network, graphics, and audio, wherein each execution of the application is responsive to a respect request to execute the application.

8. The computer-implemented method of claim 7, wherein the first processing environment includes a hardware component pertaining to a resource demand of the application, the resource demand being of a resource type, wherein the plurality of available processing environments include a first available processing environment and a second available processing environment, each having a respective component pertaining to the resource demand of the application and better fulfilling the resource demand than the component of the first processing environment, wherein the respective component of each of the first and second available processing environments is associated with a distinct vendor;
wherein the first processing environment is a general-purpose processing environment, wherein the second processing environment is a special-purpose processing environment, wherein each of the one or more candidate processing environments is a special-purpose processing environment, wherein each of the plurality of available processing environments is a special-purpose processing environment, wherein the first set of criteria is different from the second set of criteria, wherein each of the first set of criteria and the second set of criteria includes at least one of a qualitative criterion and a quantitative criterion;
wherein the method further comprises:
further updating the execution plan based on executing the application on the second processing environment; and
generating an output for the requesting entity, based on the further updated execution plan, wherein the generated output includes one or more suggestions to the requesting entity in terms of at least one of processing environments, resource types, and monetary costs, as pertaining to the application, wherein the generated output is sent to the requesting entity.

9. A computer program product to determine a processing environment suited for executing an application, the computer program product comprising:
a computer-readable storage medium having computer-readable program code embodied therewith, the computer-readable program code comprising:
computer-readable program code configured to receive a request to execute the application;
computer-readable program code configured to, upon determining that execution data identified for the application do not satisfy a first set of criteria, deploy the application for execution on a first processing environment; and
computer-readable program code configured to, upon determining that the execution data satisfy the first set of criteria:
upon determining that trial data identified for the application do not satisfy a second set of criteria, deploy the application for execution on one or more candidate processing environments selected from a plurality of available processing environments based on the execution data; and
upon determining that trial data identified for the application satisfy the second set of criteria, deploy the application for partial execution on a second processing environment of the one or more candidate processing environments, based on the execution data and the trial data,
wherein the one or more candidate processing environments provide a higher capability than the first processing environment in terms of at least a first resource type.

10. The computer program product of claim 9, wherein execution of the application is temporarily suspended in order to transfer the application between processing environments.

11. The computer program product of claim 10, wherein each of the first set of criteria and the second set of criteria includes at least one of a qualitative criterion and a quantitative criterion, wherein the application is partially executed on at least one of the one or more candidate processing environments and the second processing environment for a first time duration determined based on the execution data, and wherein the application is partially executed on the first processing environment for a second time duration different from the first time duration.

12. The computer program product of claim 11, wherein the execution data characterizes resource demands of the application over time in terms at least the first resource type and when executing in the first processing environment;
    wherein the trial data characterizes performance of the application when executing in the one or more candidate processing environments;
    wherein each available processing environment provides an enhanced capability relative to the first processing environment in terms of at least the first resource type.

13. The computer program product of claim 12, wherein the application is deployed based further on static data generated via analyzing code of the application and without executing the application, wherein the code comprises at least one of source code, object code, and machine code;
    wherein the application is deployed based further on a current utilization of at least one of the one or more candidate processing environments and the second processing environment, wherein the current utilization characterizes a load of the at least one of the one or more candidate processing environments and the second processing environment in terms of the second resource type.

14. The computer program product of claim 13, wherein the application is executed on the first processing environment to generate execution data for the application, and wherein the application is executed on the one or more candidate processing environments to generate trial data for the application, and wherein the computer-readable program code further comprises:
    computer-readable program code configured to analyze the execution data for the application to generate an execution plan for the application;
    computer-readable program code configured to select the one or more candidate processing environments based on the execution plan generated for the application;
    computer-readable program code configured to analyze the trial data for the application to update the execution plan for the application; and
    computer-readable program code configured to select the second processing environment based on the updated execution plan for the application.

15. The computer program product of claim 14, wherein the execution plan is generated based further on an execution plan template from a requesting entity from which the request to execute the application is received;
    wherein the one or more candidate processing environments are selected based further on a service level agreement from the requesting entity, wherein the second processing environment is selected based further on the service level agreement, wherein the service level agreement specifies what is acceptable to the requesting entities in terms of at least one of processing environments, resource types, and monetary costs;
    wherein each resource type is selected from at least processor, memory, storage, network, graphics, and audio, wherein each execution of the application is responsive to a respect request to execute the application.

16. The computer program product of claim 15, wherein the first processing environment includes a hardware component pertaining to a resource demand of the application, the resource demand being of a resource type, wherein the plurality of available processing environments include a first available processing environment and a second available processing environment, each having a respective component pertaining to the resource demand of the application and better fulfilling the resource demand than the component of the first processing environment, wherein the respective component of each of the first and second available processing environments is associated with a distinct vendor;
    wherein the first processing environment is a general-purpose processing environment, wherein the second processing environment is a special-purpose processing environment, wherein each of the one or more candidate processing environments is a special-purpose processing environment, wherein each of the plurality of available processing environments is a special-purpose processing environment, wherein the first set of criteria is different from the second set of criteria, wherein each of the first set of criteria and the second set of criteria includes a qualitative criterion and a quantitative criterion;
    wherein the computer-readable program code configured to further comprises:
    computer-readable program code configured to further update the execution plan based on executing the application on the second processing environment; and
    computer-readable program code configured to generate an output for the requesting entity, based on the further updated execution plan, wherein the generated output includes one or more suggestions to the requesting entity in terms of at least one of processing environments, resource types, and monetary costs, as pertaining to the application, wherein the generated output is sent to the requesting entity.

17. A system to determine a processing environment suited for executing an application, the system comprising:
    one or more computer processors;
    a memory containing a program which, when executed by the one or more computer processors, is configured to perform an operation comprising:
    receiving a request to execute the application;
    upon determining that execution data identified for the application do not
    satisfy a first set of criteria, deploying the application for execution on a first processing environment; and
    upon determining that the execution data satisfy the first set of criteria:
        upon determining that trial data identified for the application do not satisfy a second set of criteria, deploying the application for execution on one or more candidate processing environments selected from a plurality of available processing environments based on the execution data; and
        upon determining that trial data identified for the application satisfy the second set of criteria, deploying the application for partial execution on a second processing environment of the one or more candidate processing environments, based on the execution data and the trial data, wherein the one or more candidate processing environments provide a higher capability than the first processing environment in terms of at least a first resource type.

18. The system of claim 17, wherein execution of the application is temporarily suspended in order to transfer the application between processing environments.

19. The system of claim 18, wherein the application is partially executed on at least one of the one or more candidate processing environments and the second processing environment for a first time duration determined based on the execution data, and wherein the application is partially executed on the first processing environment for a second time duration different from the first time duration.

20. The system of claim 19, wherein each of the first set of criteria and the second set of criteria includes at least one of a qualitative criterion and a quantitative criterion, wherein the execution data characterizes resource demands of the application over time in terms at least the first resource type and when executing in the first processing environment;
    wherein the trial data characterizes performance of the application when executing in the one or more candidate processing environments;
    wherein each available processing environment provides an enhanced capability relative to the first processing environment in terms of at least the first resource type.

21. The system of claim 20, wherein the application is deployed based further on static data generated via analyzing code of the application and without executing the application, wherein the code comprises at least one of source code, object code, and machine code;
    wherein the application is deployed based further on a current utilization of at least one of the one or more candidate processing environments and the second processing environment, wherein the current utilization characterizes a load of the at least one of the one or more candidate processing environments and the second processing environment in terms of the second resource type.

22. The system of claim 21, wherein the application is executed on the first processing environment to generate execution data for the application, and wherein the application is executed on the one or more candidate processing environments to generate trial data for the application, and wherein the operation further comprises:
    analyzing the execution data for the application to generate an execution plan for the application;
    selecting the one or more candidate processing environments based on the execution plan generated for the application;
    analyzing the trial data for the application to update the execution plan for the application; and
    selecting the second processing environment based on the updated execution plan for the application.

23. The system of claim 22, wherein the execution plan is generated based further on an execution plan template from a requesting entity from which the request to execute the application is received;
    wherein the one or more candidate processing environments are selected based further on a service level agreement from the requesting entity, wherein the second processing environment is selected based further on the service level agreement, wherein the service level agreement specifies what is acceptable to the requesting entities in terms of at least one of processing environments, resource types, and monetary costs;
    wherein each resource type is selected from at least processor, memory, storage, network, graphics, and audio, wherein each execution of the application is responsive to a respect request to execute the application.

24. The system of claim 23, wherein the first processing environment includes a hardware component pertaining to a resource demand of the application, the resource demand being of a resource type, wherein the plurality of available processing environments include a first available processing environment and a second available processing environment, each having a respective component pertaining to the resource demand of the application and better fulfilling the resource demand than the component of the first processing environment, wherein the respective component of each of the first and second available processing environments is associated with a distinct vendor;
    wherein the first processing environment is a general-purpose processing environment, wherein the second processing environment is a special-purpose processing environment, wherein each of the one or more candidate processing environments is a special-purpose processing environment, wherein each of the plurality of available processing environments is a special-purpose processing environment, wherein the first set of criteria is different from the second set of criteria, wherein each of the first set of criteria and the second set of criteria includes a qualitative criterion and a quantitative criterion;
    wherein the operation further comprises:
    further updating the execution plan based on executing the application on the second processing environment; and
    generating an output for the requesting entity, based on the further updated execution plan, wherein the generated output includes one or more suggestions to the requesting entity in terms of at least one of processing environments, resource types, and monetary costs, as pertaining to the application, wherein the generated output is sent to the requesting entity.

* * * * *